Patented Mar. 13, 1928.

1,662,323

UNITED STATES PATENT OFFICE.

THOMAS MIDGLEY, JR., OF DAYTON, OHIO, ASSIGNOR TO GENERAL MOTORS CORPORATION, OF DETROIT, MICHIGAN, A CORPORATION OF DELAWARE.

MOTOR FUEL.

No Drawing. Application filed May 16, 1925. Serial No. 30,876.

This invention relates to the art of suppressing a fuel knock when a combustible gaseous mixture containing a low compression fuel such, for example, as kerosene and gasoline is burned under a relatively high pressure. The principal objects of this invention are to employ carbonyl compounds to suppress the fuel knock.

This application is a continuation in part of my application Serial No. 663,503, filed September 18, 1923.

Kerosene has a normal critical compression pressure of about 55 pounds. The normal critical compression pressure of gasoline varies from about 75 pounds for the commoner forms now marketed to about 125 pounds for "aviation gasoline", employed in airplane engines. These fuels are termed low compression fuels. When the vapors of any one of them is mixed with air, compressed to a compression pressure in excess of the normal critical compression pressure of the fuel, and burned, as in an internal combustion engine, a fuel knock is produced.

I have found that when the fuel air mixture is burned under relatively high pressure in the presence of vapors of carbonyl compounds of metals, the burning takes place without a fuel knock or with a diminished fuel knock depending upon the relative compression of the engine and fuel and the proportionate quantity of the carbonyl compound employed. Where the nature of the metal-carbonyl compound changes before ignition of the fuel, combustion takes place in the presence of the new compound and the anti-knock value depends on the nature of the new compound instead of the compound added to the fuel.

By way of an example of one method of carrying out my invention, I dissolve 12 c. c. of nickel carbonyl ($Ni(CO)_4$) in 1 gallon of gasoline having a normal critical compression pressure of about 75 pounds. This solution or high compression fuel is fed through a carburetor into the cylinder of an internal combustion engine having a compression pressure of about 100 pounds, the solution being vaporized and mixed with air as is common practice in engine operation. The gaseous high compression fuel is ignited and the engine operated without a fuel knock. The gasoline forms the fuel base and the carbonyl compound increases the critical compression pressure of this base.

While an oil soluble carbonyl is preferable for commercial uses, a blending agent may be employed to obtain a homogeneous mixture with carbonyls which are relatively insoluble or a carbonyl compound may be employed without first mixing it with the motor fuel.

What I claim is:

1. A motor fuel comprising a low compression fuel, and nickel carbonyl.
2. An internal combustion engine fuel containing a nickel carbonyl.
3. A motor fuel containing a carbonyl of a metal other than iron.
4. A motor fuel containing a volatile carbonyl of a metal other than iron.
5. A motor fuel containing an oil soluble carbonyl of a metal other than iron.
6. A motor fuel containing a volatile and oil soluble carbonyl of a metal other than iron.

In testimony whereof I hereto affix my signature.

THOMAS MIDGLEY, JR.